(12) United States Patent
Zürn et al.

(10) Patent No.: US 8,794,881 B2
(45) Date of Patent: Aug. 5, 2014

(54) DRILLING TOOL

(75) Inventors: Alexander Zürn, Altshausen (DE); Martin Stumpp, Ravensburg (DE)

(73) Assignee: DreBo Werkzeug Fabrik GmbH, Altshausen (DE)

( * ) Notice: Subject to any disclaimer, the term of this patent is extended or adjusted under 35 U.S.C. 154(b) by 272 days.

(21) Appl. No.: 13/323,645

(22) Filed: Dec. 12, 2011

(65) Prior Publication Data

US 2012/0148359 A1    Jun. 14, 2012

(30) Foreign Application Priority Data

Dec. 14, 2010 (DE) .......................... 10 2010 061 214

(51) Int. Cl.
*B23B 51/04* (2006.01)
*B23B 31/107* (2006.01)

(52) U.S. Cl.
CPC ....... *B23B 51/0426* (2013.01); *B23B 2260/124* (2013.01); *B23B 31/1075* (2013.01); *B23B 2226/75* (2013.01); *Y10S 408/703* (2013.01)
USPC ........... 408/204; 408/206; 408/703; 175/403

(58) Field of Classification Search
CPC .... B23B 51/04; B23B 51/05; B23B 51/0426; B23B 51/0433
USPC .................. 408/204, 206, 703; 175/403, 405
See application file for complete search history.

(56) References Cited

U.S. PATENT DOCUMENTS

| | | | | |
|---|---|---|---|---|
| 1,430,932 A | * | 10/1922 | Bogstrand | 408/119 |
| 1,441,994 A | * | 1/1923 | Mueller | 408/193 |
| 4,992,009 A | * | 2/1991 | Wallach | 408/67 |
| 5,049,010 A | * | 9/1991 | Oakes | 408/201 |
| 5,813,802 A | | 9/1998 | Ajimi et al. | |
| 6,116,827 A | | 9/2000 | Moser et al. | |
| 6,213,230 B1 | | 4/2001 | Fuss | |
| 6,375,396 B1 | * | 4/2002 | Fangmann et al. | 408/206 |
| 2004/0042861 A1 | * | 3/2004 | Capstran | 409/132 |
| 2010/0047030 A1 | * | 2/2010 | Eiserer et al. | 408/204 |

FOREIGN PATENT DOCUMENTS

| | | | | |
|---|---|---|---|---|
| DE | G 85 21 577.5 U1 | 5/1986 | | |
| JP | 57-201114 A | * 12/1982 | | B23B 51/04 |
| JP | 2001-062783 A | * 3/2001 | | B23B 51/04 |

\* cited by examiner

*Primary Examiner* — Andrea Wellington
*Assistant Examiner* — Ryan Rufo
(74) *Attorney, Agent, or Firm* — John C. Thompson; Sandra J. Thompson

(57) ABSTRACT

The invention relates to a drilling tool having a large drill, in particular a core drill, in which a center drill is guided in an axially flexible or movable manner, with the axial movement of said center drill relative to said large drill being limited by at least one limit stop, wherein at least one pin that is supported on the large drill, the shaft thereof or a transition therebetween, extends toward the center drill, and the pin (24) is formed at an attachment body (26) comprising a contact surface (46) that abuts on a counter contact surface (52) of the drilling tool (10) and in particular has at least partially a larger lateral extension than the pin.

14 Claims, 2 Drawing Sheets

DRILLING TOOL

TECHNICAL FIELD

The present invention relates to a drilling tool having a large drill, in particular a core drill, in which a center drill is guided in an axially flexible or movable manner, with the axial movement of said center drill relative to said large drill being limited by at least one limit stop

BACKGROUND OF THE INVENTION

A drilling tool of this kind may be configured as a core drill or core bit, but also as a rasp, and often requires a center drill for precisely placing the desired drilling or milling holes. Moreover, the center drill then extends coaxially to the large drill and protrudes with respect to the hard metal plates or tungsten carbide tips of the core drill.

In this approach that for example has prevailed for the placement of circular cylindrical recesses for the accommodation of switches and plugs in stone, concrete and brick or for wall breakthroughs, the center drill is involved in the drilling progress and comprises a hard metal plate or tungsten carbide tip in a manner known per se. It has been known for a long time to use a standard SDS-plus shaft for imparting a rotary driving motion to the center drill and for the accommodation thereof in the large drill, said standard SDS-plus shaft combining rotary driving grooves and guide grooves that act in the axial direction.

An approach of this kind is evident for example from DE-U-85 21 577. In this approach, two opposed threaded pins extend into the rotary driving grooves of the center drill; additionally, a locking element is provided as pull-out protection.

This approach has not prevailed in construction site practice. The worker in charge of the placement of the desired drill holes, often simply lets snap in the center drill into the locking element and does not care about the position of the one or more threaded pins. The center drill in this position has already snapped in and in this respect does not slip out when the worker holds the hammer drill with the center drill downward. Since the locking element is not intended for imparting the rotary driving motion, the center drill rotates in this position during the drilling operation in its drill mount or receptacle in the large drill, thereby resulting in the fast wear of the locking element and the center drill at its shaft.

Moreover, a certain experience is required for the setting of the threaded pins and a strict adherence to the standard operation procedures that are often not adhered to by the workers at construction sites. Namely, the threaded pins must be screwed into the rotary driving grooves as far or deep as possible, but must not block the center drill in a gripper-like manner. Through this, the threaded pins would be overstrained and would either break or at least be subjected to wear. It has also been observed that the quite thin threaded pins are quickly sheared off by the considerable torque exerted thereon at the front end thereof, so that the center drill in turn is free to rotate within its drill mount.

The disadvantages of the established solution have led to the taking into account of alternative solutions or approaches. About 10 years later it has been suggested to provide the center drill—instead of using the two pins that protrude into opposite grooves of the center drill—with a bevel which is to serve as a rotary drive for which purpose a pin that is guided at a clip, extends transversely to the center drill in a respective guide rail at the shaft of the large drill. This solution indeed does not lead to a wear of the center drill. However, in practice, it has also proved to be disadvantageous, since with this embodiment the large drills itself surprisingly often broke, probably because of the weakening at the shaft root due to the aperture mount for mounting the pin.

OBJECTS AND SUMMARY OF THE INVENTION

Therefore, the invention is based on the object of producing a drilling tool that is fracture-proof and wear-resistant and permanently enables a good drilling progress of a large drill.

With the aid of the inventive measures, a safe mounting of the center drill in a large drill that is driven by a hammer drill, may surprisingly be realized. A SDS drill may as well readily be employed as a center drill that is available as standard and cost-efficiently, but is especially preferred to use a center drill with a specific groove that comprises a flat groove bottom and respectively ends in a fillet in the axial direction thereof. A particular pin engages with this groove according to the invention, which pin is mounted on an attachment body whose lateral extension is considerably larger than the pin, at least partially clearly larger. "Clearly larger" refers to twice the diameter for example, if both the pin and the attachment body are formed to be circular in shape.

The combination of the attachment body and the pin surprisingly offers a wear-free rotary drive and safe guidance on the one hand and operating reliability on the other hand which prevents the appearance of wear ahead of time due to improper use.

In an advantageous embodiment of the invention the attachment body comprises an external thread that co-operates with an internal thread of the large drill. The screw formed in this manner is conveniently self-locking so that its axial position is fixed. Advantageously, moreover a limit stop for the axial depth of the attachment body is formed, and namely through the co-operation of the contact surface and the counter contact surface.

According to the invention additional locking elements are deliberately dispensed with that could generate the illusion of a sufficiently attached center drill.

In a particularly advantageous embodiment, the attachment body is configured with a cone surface that serves as a contact surface opposite to a counter contact surface in the large drill. The arrangement can be provided in an aperture or through-recess either at the shaft, the large drill itself or at a transition therebetween. Surprisingly, the large drill does not break at this position according to the invention, possibly due to the merely one-sided construction of an aperture so that the expensive replacement costs do not apply.

According to the invention it is also favorable that the contact surface extends as far as to the pin. The torque exerted on the attachment body, i.e. the lateral load, is then comparatively small. Additionally, the guidance is reduced due to the area enlargement at the contact surface and the counter contact surface, so that the large drill itself is only subjected to very low load or strain due to the alternating load for the rotary drive of the center drill.

It is particularly favorable, too, that the contact surface and the respective counter contact surface are configured to have conical shape. Due to the selection of the cone angle, a self-locking operation may be achieved that prevents the pin that is stressed radially outward because of the centrifugal forces, and the attachment body from getting loose.

Preferably, the attachment body comprises an external thread at a position that is disposed further radially outward relative to the contact surface, said external thread being guided in a correspondingly matching internal thread in the aperture of the large drill. In the screwed-in condition, that is to say if the contact surface forms a limit stop in the direction toward the counter contact surface, the attachment body then extends plane and with small outward protrusion in relation to a shaft of the large drill.

It is to be understood that any suitable force transmitting surfaces can be provided for imparting the rotary driving motion to the attachment body during the screwing-in operation. For example, the attachment body in the area of its internal thread may comprise a hexagon socket profile that is operable with an Allen or socket wrench for screwing in the attachment body. Instead of the hexagon socket profile, also a square-end or a torx-end drive profile may be used and it goes without saying that basically a cross-recessed profile or any other suitable profile for imparting a rotary driving motion may be realized at the screw head of the attachment body, too, without departing from the scope of the invention.

Due to the arrangement of the external thread at the opposite side of the pin, an external thread with a comparatively large diameter may be readily achieved, which provides a harmonic basic structure of the attachment body and a close proximity of the contact surface to the pin itself.

The step or protrusion that is inventively provided as a diameter change toward the pin on the one hand and the contact surface on the other hand, permits the desired large-area contact of the attachment body in the large drill without impairing the proper functioning of the center drill due to an outsized groove.

The width of the groove of the center drill and thus the pin diameter that corresponds to the width of the groove and enables a low-backlash support of the pin in the groove, may be adapted to the requirements in large areas.

The width of the groove for example may amount to 30% to 55%, preferably to approximately 40% to 45% of the diameter of the center drill. With this dimensional ratio, there is still enough "flesh" available in the area of the shaft of the center drill on the side of the groove even if a certain wear on the pin has occurred due to the rotary drive of the center drill at this location.

In a further advantageous development the pin is attached within the large drill, its shaft or a transition therebetween, and protrudes into a recess, in particular a groove, of the center drill for rotation therewith.

In a further advantageous development the contact surface of the pin of the drilling tool is configured as a conical surface that extends in particular in a self-locking manner with a cone angle toward the pin, said angle being smaller than 15 degrees and larger than 0.5 degree and in particular amounting to 2 to 8 degrees.

In a further advantageous development both the pin and the contact surface are configured to have circular shape and that the contact surface merges into the pin and the lateral extension forms the diameter of the contact surface.

In a further advantageous development the transition between the pin and the contact surface is formed at a step or offset that in particular forms a circular ring surface area whose surface normal—in relation to the large drill—points radially inward.

In a further advantageous development the diameter of the contact surface at its smallest position is at least one and a half times as large as the diameter of the pin, in particular is less than four times and particularly preferably is approximately twice as large.

In a further advantageous development the attachment body comprises an external thread that is arranged on the side of the contact surface opposite of the pin and that has the same or in particular a larger diameter compared to the contact surface and engages with an internal thread of the drilling tool.

In a further advantageous development the attachment body is formed from the sequence pin—contact surface—thread with an increasing diameter, the axial length of the thread and the contact surface substantially being the same, and in particular being 20% to 100%, preferably about 50% larger than the axial length of the pin.

In a further advantageous development a groove is formed in the center drill of the drilling tool, with said groove substantially extending parallel to the axis and in particular respectively ending in a semicircular arrangement, and that a rotary driving surface is formed at a groove flank.

In a further advantageous development the groove comprise a flat bottom of the groove, said groove extending in the region between the axis of the center drill and the outer periphery thereof, and whose surface normal—in relation to the center drill—extends radially outward, with the bottom of the groove being spaced from the axis of the center drill less than half its radius.

In a further advantageous development the pin is configured as a round pin having a length-to-diameter-ratio of between 0.5 and 2.0, in particular between 0.75 and 1.5 and particularly preferably approximately 1.0, and in that the pin engages into a groove of the center drill and in that the groove ends in particularly semicircular fillets.

In a further advantageous development the pin protrudes into a groove of the center drill, in particular a distance between 0.35% and 0.95% of the depth of the groove and in particular preferably more than 60% of the depth of the groove.

In a further advantageous development the circular ring-shaped step surface of the attachment body toward the pin in the assembled condition is radially spaced apart from the center drill more than 50 μm, in particular more than 0.2 mm.

In a further advantageous development an aperture or through-recess is formed in the shaft or in the transition area of the drilling tool, said aperture accommodating the attachment body and aligning with the groove of the center drill in the inserted condition of the center drill, wherein the aperture in particular comprises an internal thread.

In a further advantageous development the abutment of the contact surface of the attachment body on the counter contact surface in the drilling tool forms a limit stop for the depth of penetration of the pin into the groove of the center drill.

Further advantages, details and features will become apparent from the following description of an embodiment of the invention in conjunction with the drawings, in which

DETAILED DESCRIPTION

Figure 1:
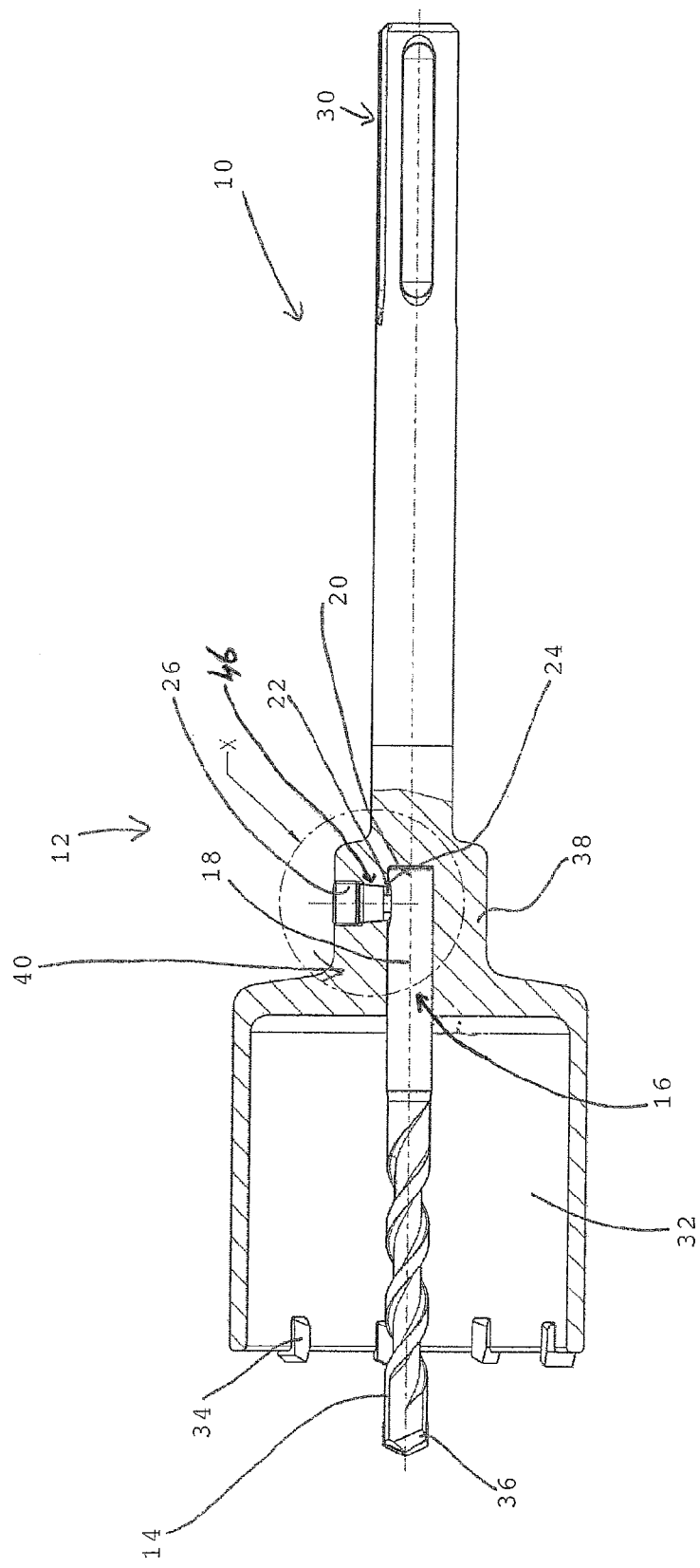
FIG. 1 shows a schematic view of a drilling tool according to the invention in a partially broken side view.

The drilling tool 10 represented in FIG. 1 comprises a large drill 12 in which a center drill 14 is guided in an axially movable manner. To this end, the large drill 12 comprises a blind hole 16 into which a shaft 18 of the center drill extends.

The shaft 18 inventively comprises a groove 22 near its rear end 20, but at least with a distance therefrom of 1 mm, said groove 22 accommodating a pin 24 that is formed at an attachment body 26 so as to protrude radially inward. The attachment body is accommodated within the large drill 12 in a torque-proof manner, and its configuration is described in detail in connection with FIG. 2.

Moreover, the large drill 12 comprises a SDS-max shaft 30, whereas it is to be understood that any other suitable shaft design or configuration may be employed as well. The large drill 12 is configured as a core drill in the illustrated exemplary embodiment. To this end, the large drill in a manner known per se comprises a hollow cylinder 32 that is open at one side thereof and is equipped at its front side with hard metal plates or tungsten carbide tips 34 distributed over the circumference thereof. The hard metal plates 34 are clearly overtopped by the center drill 14 which in a manner known per se is equipped with a hard metal plate 36 as well.

The attachment body 26 is arranged at the thickened shaft area 38 of the large drill 12 in the illustrated exemplary embodiment. It is to be understood that an arrangement at the transition 40 or at any other suitable position of the large drill 12 is possible as well instead.

Figure 2:
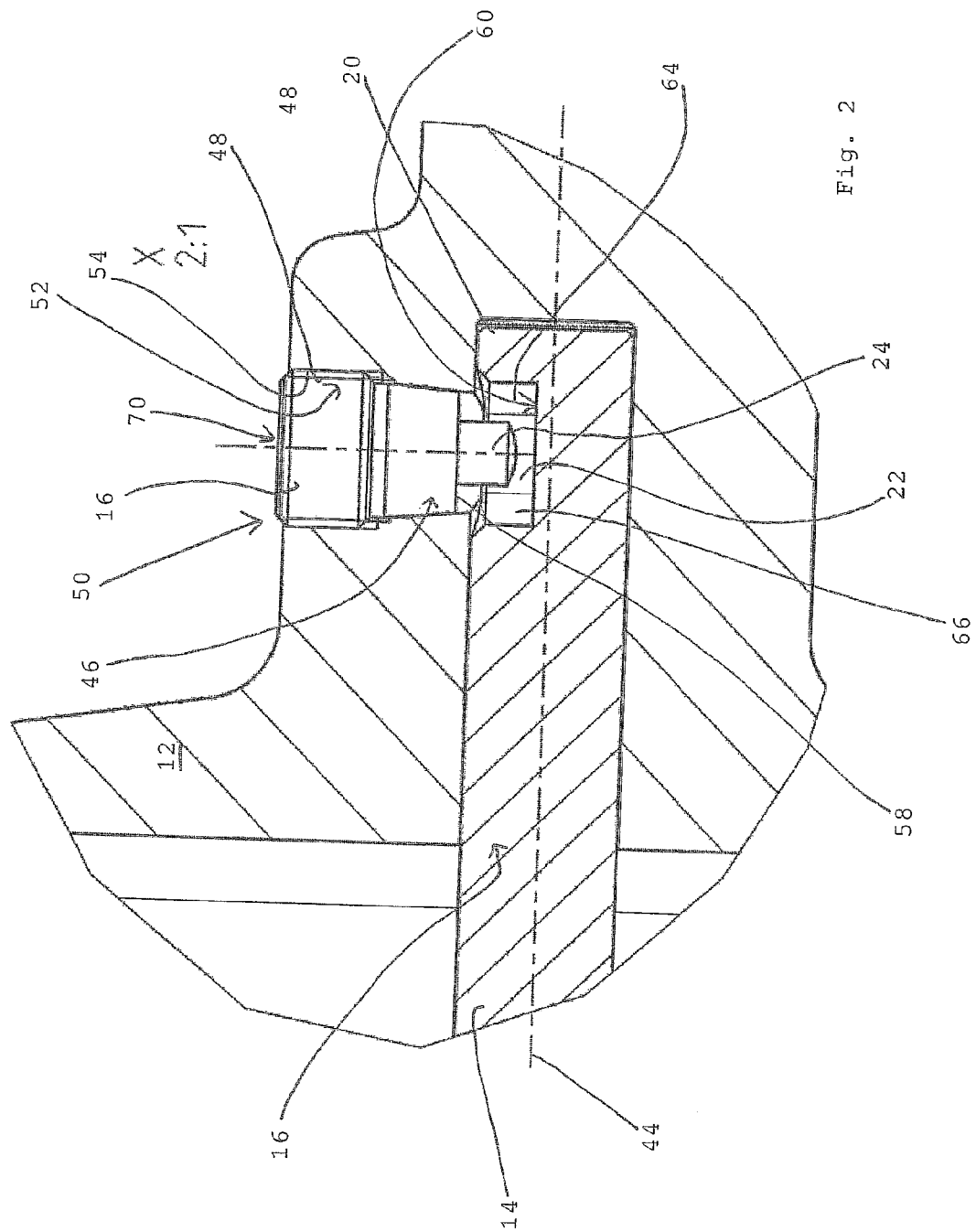
FIG. 2 shows an enlarged representation of section X of FIG. 1.

FIG. 2 shows the inventive configuration of the attachment body 26 in detail. The attachment body 26 is formed integrally and comprises three sections, that is to say the pin 24, a contact surface 46 and an external thread 48, if regarded from the drill axis 44. The pin 24 protrudes through the blind hole 16 into the large drill 12, with the contact surface 46 and the external thread 48 being received within an aperture 50 for the accommodation of the attachment body in the large drill 12.

To this end, the aperture 50 comprises a counter contact surface 52. The counter contact surface 52 and the contact surface 56 extend conically with a cone angle that retains the attachment body 26 in the aperture in a self-locking manner. At this position, a rotary drive force transmission takes place, but also an axial force transmission between the attachment body 26 on the one hand and the large drill 12 on the other hand.

On the side of the contact surface 46 facing away from the pin 24, the external thread 48 is formed whose diameter is somewhat larger than the diameter of the contact surface 46. It fits an internal thread 54 in the aperture 50.

A circular ring surface area 58 is formed at the transition between the pin 24 and the conical contact surface 46, said circular ring surface area 58 effecting a change in diameter between the contact surface 46 and the pin 24. The circular ring surface area 58 with its surface normal faces toward the axis 46 and is slightly spaced apart from the center drill 14. This design causes the axial contact for the screwing-in of the attachment body 26 neither being realized at said circular ring surface area 58 nor via the contact between the pin 24 and a groove bottom 60 of the groove 22, but via the contact between the contact surface 46 and the counter contact surface 52.

The radial position of the attachment body 26 in the aperture 50 is thus fixed to offer safe operation and the precise position of the pin 24 in relation to the groove 22 is determined in this manner.

The groove 22 ends in fillets 64 and 66 that extend in a semicircular manner, and indeed with a diameter that substantially corresponds to the diameter of the pin 24. The pin 24 comprises a length-to-diameter-ratio of one to one in the illustrated exemplary embodiment. While the groove 22 in the illustrated exemplary embodiment is configured as a flat groove, it is to be understood that instead of a flat groove any other configuration, for example a round groove, a trapezoid groove or a cylindrical groove, or as well a V-shaped groove is to be considered. Moreover, the pin 24 does not have to be cylindrical but can have any suitable round, square or even conical shape, wherein it is preferred that the extension of the side flanks of the groove 22 and the external surfaces of the pin 24 are selected to fit each other.

According to the invention it is further favorable to provide a releasable but safe support or mounting of the attachment body 26 in the large drill. To this end, a rotary drive profile (not shown) for the screw actuation at the external side 70 of the attachment body 26 such as a hexagon socket profile, is provided.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the terms as used in the claims are intended to include not only the designs illustrated in the drawings of this application and the equivalent designs discussed in the text, but are also intended to cover other equivalents now known to those skilled in the art, or those equivalents which may become known to those skilled in the art in the future.

What is claimed is:

1. A drilling tool having
   a large core drill (24);
   a center drill (14) mounted in an axially flexible manner within the large drill;
   at least one limit stop limiting axial movement of said center drill relative to the large drill;
   at least one pin (24) that is supported on the large drill, the shaft thereof extending towards the center drill (14);
characterized in that
   the pin (24) is formed at an attachment body (26) comprising a contact surface (46) that abuts on a counter contact surface (52) of the drilling tool (10), the contact surface (46) of the pin (24) of the drilling tool (10) is configured as a conical surface that extends in self-locking manner with a cone angle toward the pin, the angle being smaller than 15 degrees and larger than 5 degrees.

2. The drilling tool as claimed in claim 1, characterized in that the pin (24) is attached within the large drill (12), the pin (24) protrudes into a groove (22) of the center drill (14) for rotation therewith.

3. The drilling tool as claimed in claim 1, characterized in that both the pin (24) and the contact surface (46) are configured to have circular shape.

4. The drilling tool as claimed in claim 1, characterized in that the transition between the pin (24) and the contact surface (46) is formed at a step or offset that forms a circular ring surface area (58) whose surface normal, in relation to the large drill (12), points radially inward.

5. The drilling tool as claimed in claim 1, characterized in that the diameter of the contact surface (46) at its smallest position is at least one and a half times as large as the diameter of the pin (24), and is less than four times as large.

6. The drilling tool as claimed in claim 1, characterized in that the attachment body (26) comprises an external thread (46) that is arranged on the side of the contact surface opposite of the pin (24) and that has the same or a larger diameter compared to the contact surface and engages with an internal thread (54) of the drilling tool (10).

7. The drilling tool as claimed in claim 1, characterized in that the attachment body (26) is formed from the sequence pin—contact surface—thread with an increasing diameter, the axial length of the thread and the contact surface (46) substantially being the same, and being about 50% larger than the axial length of the pin.

8. The drilling tool as claimed in claim 1, characterized in that a groove (22) is formed in the center drill (14) of the drilling tool (10), with said groove (22) substantially extending parallel to the axis of the center drill (14) and ending in a semi-circular arrangement, and that a rotary driving surface is formed at a groove flank.

9. The drilling tool as claimed in claim 8, characterized in that the groove (22) has a flat bottom, said groove (22) extending in the region between the axis (44) of the center drill (14) and the outer periphery thereof, and whose surface normal—in relation to the center drill—extends radially outward, with the bottom of the groove being spaced from the axis of the center drill less than half its radius.

10. The drilling tool as claimed in claim 1, characterized in that the pin (24) is configured as a round pin having a length-to-diameter-ratio of between 0.5 and 2.0, and in that the pin (24) engages into a groove (22) of the center drill (14) and in that the groove ends in semicircular fillets.

11. The drilling tool as claimed in claim 1, characterized in that the pin (24) protrudes into a groove (22) of the center drill (14) a distance between 0.35% and 0.95% of the depth of the groove.

12. The drilling tool as claimed in claim 1, characterized in that a circular ring-shaped step surface (58) of the attachment body (26) toward the pin (24) in the assembled condition is radially spaced apart from the center drill (14).

13. The drilling tool as claimed in claim 2, characterized in that an aperture or through-recess (50) is formed in the shaft (18) or in the transition area of the drilling tool (10), said aperture accommodating the attachment body (26) and aligning with the groove (22) of the center drill (14) in the inserted condition of the center drill (14), wherein the aperture comprises an internal thread (54).

14. The drilling tool as claimed in claim 1, characterized in that the abutment of the contact surface (46) of the attachment body (26) on the counter contact surface (52) in the drilling tool (10) forms a limit stop for the depth of penetration of the pin (24) into the groove (22) of the center drill (14).

* * * * *